Patented Nov. 2, 1948

2,452,552

UNITED STATES PATENT OFFICE 2,452,552

FISHING BAIT AND METHOD OF PREPARING THE SAME

Osborn M. Curtis, Jr., and Theodore M. Prudden, Hingham, Mass., assignors to LobLure, Inc., Hingham, Mass., a corporation of Maine No Drawing. Application January 10, 1945, Serial No. 572,244

8 Claims. (Cl. 99—3)

This invention relates to a crustacean bait and is a continuation-in-part of our earlier application, Serial No. 564,714, filed November 22, 1944, now abandoned.

As disclosed in said application aforesaid, lobsters are attracted by an essence given off by decaying fish or animal matter, such essence being particularly effective when entrapped in water or oil and diffused from the lobster pot under such conditions of control that the spending thereof shall cover a protracted period of time.

According to our present discovery, such essence may be conveniently entrapped in a solid base or carrier which diffuses the essence in the fishing water, rather than in a liquid such as oil or water. So entrapped, its rate of diffusion may be effectively controlled by control of the dispersible characteristic of the base or carrier or by other methods.

Other advantages will appear as this description proceeds.

Our discovery is based on the recognition that certain solids readily absorb odors and hence may not only serve as a base or carrier for the essence, which is usually a gas, of our bait, but also gradually liberates this essence and limits the rate of diffusion of the essence. This attribute is well known to any housewife who is plagued by having butter in an ice chest absorb odor from other articles therein.

Greases are particularly effective for this purpose. By reducing the grease to liquid form and stirring into it the decaying ground fish or animal matter, we are able to obtain impregnation of the grease by the essence on hardening of the grease. Or, we may bubble the essential gas through the grease and thereby effectively impregnate it. Or, we may saponify a grease to a soap, and thus obtain a solid base or carrier in which the essence is entrapped.

When the essence-impregnated soap or other grease base or carrier is placed in the lobster pot and the pot immersed in the fishing water, the soap or grease releases the gases entrapped therein which are slowly dispensed along the sea bottom after the lobster pot has reached the bottom.

The rate of release of the gases will be retarded somewhat where the bait is used in fishing water which is salt, such as sea water, or cold, such as sea water well below the surface. The rate of release of the gas may be further controlled by (1) the bulk of the grease-impregnated carrier material, (2) by the degree of its impregnation with the gases, and (3) by protecting the impregnated carrier material against erosion or by being eaten away. If the base or carrier be a grease as such, rather than grease which has been saponified to form a soap, the rate of diffusion of the gases will be slower. Such diffusion, however, may be accelerated if we use as the base or carrier an oil or other substance which may be made to readily blend with the sea water.

For this purpose we find a vegetable oil, such as coco-oil, which is a solidified oil derived from the coconut, especially effective, although we may use other greasy or oily carrier substances.

Coco-oil, however, is particularly recommended not only because it may be made to lather in sea water, but also because it has a distinctive odor which is attractive to lobsters. Moreover, it is solid rather than fluid at ordinary temperatures.

Another advantage of coco-oil is that very little heat is needed to change the coco-oil from a solid to a liquid, whereas much more heat may be needed to liquefy most greases and considerable heat is necessary in making soap. The effect of high temperatures in the preparation of our bait is deleterious in that the heat tends to drive off or destroy the very essence which we are seeking to entrap in the base or carrier.

As suggested in our aforesaid application, our product may be advantageously enclosed in a container of such construction as to protect the bait against consumption by sea fleas and smaller fish while at the same time controlling the diffusion of the essence through the interstices thereof as the base or carrier dissolves in the fishing water.

The term "grease" as used herein is employed in its broader sense to include any greasy or oily carrier. The greasy carrier may be one which has been saponified to form a soap. The oily carrier may be one which has a sulphonated oil base. Or, it may be one in which oil has been mixed with a wetting agent, such as "Aerosol" to reduce its surface tension. Or, it may be merely an oil alone, such as coco-oil. Or, we may prefer to utilize the property of viscous liquids, of which molasses might be an example, to entrap bubbles of gas and very slowly release them. Witness the effect of shaking a bottle of cold molasses so that tiny bubbles of air are dispersed through it. The viscosity of the molasses opposes the tendency of the bubbles to rise to the surface and entraps them in the molasses for a considerable period of time, although the bubbles are slowly working their way to the surface. This is not an impregnation or absorption of the viscous molasses with the air but is rather a physical trapping. The viscosity is not less than that of S. A. E. motor oil No. 20 at 70° F.

The foregoing is suggestive of some of the more important aspects of our invention. We recognize, however, that the constituents of our bait, as well as its mode of preparation and use, may be varied somewhat as conditions require. All such variations are to be considered as embraced by our invention, if within the limits of the appended claims.

What we therefore claim and desire to secure by Letters Patent is:

1. A crustacean bait, comprising an absorbent carrier of the class consisting of grease, soap, coco-oil and oil which is dispersible in fishing water and into which has been absorbed a crustacean-attractive essence adapted to be released at a rate related to the rate at which the carrier disperses in the fishing water.

2. The bait of claim 1, wherein the attractive essence is derived from decaying matter of the class of fish and animal matter.

3. The bait of claim 1, wherein the carrier is coco-oil.

4. The method of preparing and controllably dispersing a crustacean bait in fishing water, which comprises impregnating an absorbent carrier of the class consisting of grease, soap, coco-oil, and oil and which is dispersible in fishing water with a crustacean-attractive essence, and immersing the bait in fishing water to cause release of the essence at a rate related to the rate at which the carrier disperses in the water.

5. The method of claim 4 wherein the attractive essence is derived from decaying matter of the class of fish and animal matter.

6. The method of claim 4, wherein the carrier is in liquid form and impregnated before the mass is allowed to harden.

7. The method of claim 4, wherein the carrier is impregnated with gases.

8. The method of claim 4, wherein the carrier is first saponified and then impregnated.

OSBORN M. CURTIS, Jr.
THEODORE M. PRUDDEN.

REFERENCES CITED

The following references are of record in the file of this patent:

UNITED STATES PATENTS

| Number | Name | Date |
|---|---|---|
| 871,935 | Hanzel | Nov. 26, 1907 |
| 1,185,894 | Evans | June 6, 1916 |
| 1,366,509 | Thiessen | Jan. 25, 1921 |

FOREIGN PATENTS

| Number | Country | Date |
|---|---|---|
| 23,445 | Danish | 1918 |